United States Patent [19]

Baird

[11] 4,141,431
[45] Feb. 27, 1979

[54] DETERMINATION OF FIRING TIMES OF ACOUSTIC PULSES

[75] Inventor: George C. Baird, Keston, England

[73] Assignee: Seismograph Service Corporation, Tulsa, Okla.

[21] Appl. No.: 863,260

[22] Filed: Dec. 22, 1977

[30] Foreign Application Priority Data

Oct. 4, 1977 [GB] United Kingdom ............... 41240/77

[51] Int. Cl.² .......................................... G01V 1/38
[52] U.S. Cl. ..................................... 181/118; 181/110
[58] Field of Search ............... 181/118, 110, 115, 120, 181/116; 340/7 R

[56] References Cited

U.S. PATENT DOCUMENTS 3,048,816  8/1962  Lubnow .............................. 181/118
3,382,946  5/1968  Smith, Jr. et al. .................... 181/118

Primary Examiner—Maynard R. Wilbur
Assistant Examiner—Lawrence Goodwin
Attorney, Agent, or Firm—Mason, Kolehmainen, Rathburn & Wyss

[57] ABSTRACT

A marine gun for the production and timing of underwater pulses by the discharge of gas under pressure comprises a body having at least one port, means retaining the gas in said body under pressure and for allowing it to discharge through said port to produce said pulses, said gun including at least two electrodes which make electrical contact with the water in the path of gas discharged through said port such that such a discharge of gas increases the electrical resistance between said electrodes to produce a timing signal.

9 Claims, 7 Drawing Figures

DETERMINATION OF FIRING TIMES OF ACOUSTIC PULSES

FIELD OF THE INVENTION

This invention relates to methods of and apparatus for the production of acoustic pulses and for indicating the onset times of such pulses. The invention is more especially concerned with seismic signals which are produced under water by means of air guns, although it could also be applied to the use of other energy sources.

BACKGROUND OF THE INVENTION

When an energy source which comprises a number of individual sources, such as an array of air guns, is used in a seismic marine survey, it is an important requirement that the firing times of the individual guns should be known, so that they may be suitably synchronised or allowances made for any differences in the individual firing times. Synchronisation may be effected by means of an electronic control unit, such as that described in U.S. Pat. No. 3,985,199.

In the case of marine air guns attempts have been made to obtain a "gun-operate" signal from the current supplied to a solenoid, which is normally mounted in or on the gun so that energisation of the solenoid causes a valve in the gun to open and allow a blast of compressed air to be released into the surrounding water to produce the pulse. Assumptions have been made that the onset of the current to the solenoid, or a secondary pulse which is obtained from the actual movement of the iron slug in the solenoid, bears constant time relationship with the accoustic time pulse which is generated by the blast of air discharged from the gun. In practice, however it has been found that there is a variable time delay between the current pulse and the air blast, which may amount to several milliseconds. Such variable time delays may occur between the operation of the solenoid and the operation of the valve which releases the air from the gun or they may be caused by the variations in the air pressure in the gun, or by mechanical wear in the moving parts. Whatever the cause they can seriously impair the efficiency and accuracy of the multiple gun array.

The present invention sets out to overcome this problem and to avoid or reduce any errors, which it does by using the actual blast of air discharged into the medium to produce a "gun operate" signal, that is a signal which indicates the time of firing of the gun and the generation of the seismic pulse. It is a valuable feature of this invention that it uses a variation in the resistance of an electrical circuit caused by the air itself to produce the seismic signal or pulse without the intervention of any mechanical switch or other moving parts.

An air gun which is well-known as the energy source in the seismic survey work conducted at sea or in rivers or swamps comprises a casing having a chamber provided with an inlet which is connected to a source of air under pressure. This chamber opens into the surrounding water through several (usually four) large outlet ports formed in its side wall, which ports are normally closed by means of a shuttle valve operating in the casing. With this valve closed, the air pressure is built up in the gun to a pressure of about 2,000 pounds per square inch, the effect of which is to keep the valve closed until a solenoid-operated secondary valve is opened to allow the pressure to act on the main shuttle valve in a direction to cause it to open and allow the rapid discharge of the compressed air from the chamber into the surrounding water. This generates a seismic pulse as the air bubble produced expands into the water.

OBJECTS OF THE INVENTION

It is an object of the present invention to make use of this discharged air to provide "gun operate" signsls in the form of electrical signals which have a close and accurate relationship with the onsets of the accoustic pulses.

A further object of the invention is to use the differences between electrical resistances of air and water for the production of these electrical signals.

A still further object of the invention is to provide means for doing this using one or more electrodes mounted in the path of the air discharged from the gun.

Yet another object of the invention is to provide electrical circuitry and apparatus for using such changes in electrical resistance to provide the required "gun operate" signals.

SUMMARY OF THE INVENTION

The invention, in one of its preferred aspects, provides a marine gun for the production of seismic signals in water by the sudden discharge of a gas under pressure into the water through at least one port in the gun, which gun includes two electrodes which are electrically insulated from each other and at least one of which has an exposed conductive part lying in the path of gas discharged through the port such that this electrode is normally in electrical contact with the water when the gun is immersed in the latter, but is surrounded by air discharged from the port when the gun is fired, so that firing of the gun produces an increase in the electrical resistance between the electrodes.

One electrode may be constituted by the body of the gun, to which the other electrode is attached but from which it is electrically insulated. This other electrode may take the form of a blade which extends across the port or it may be constituted by a length of wire which is attached to but insulated from the body of the gun at one or both ends.

This gun is connected to an electrical circuit which includes means responsive to the increase in resistance between the electrodes which are produced by the gas bubble which is formed at the port on the firing of the gun to provide an electrical signal indicative of the time at which the gun fired. The circuit, according to one of the features of this invention, includes a source of voltage and a resistance which are connected in series with the electrodes of the gun and means responsive to a change in potential difference between two points along this circuit resulting from the increase in resistance between the electrodes for producing the said signal upon the firing of the gun.

Further objects, features and advantages of the invention will become apparent from the following description. Reference will be made to the accompanying drawings, in which:

DESCRIPTION OF PRESENTLY PREFERRED EMBODIMENTS

Figure 1:
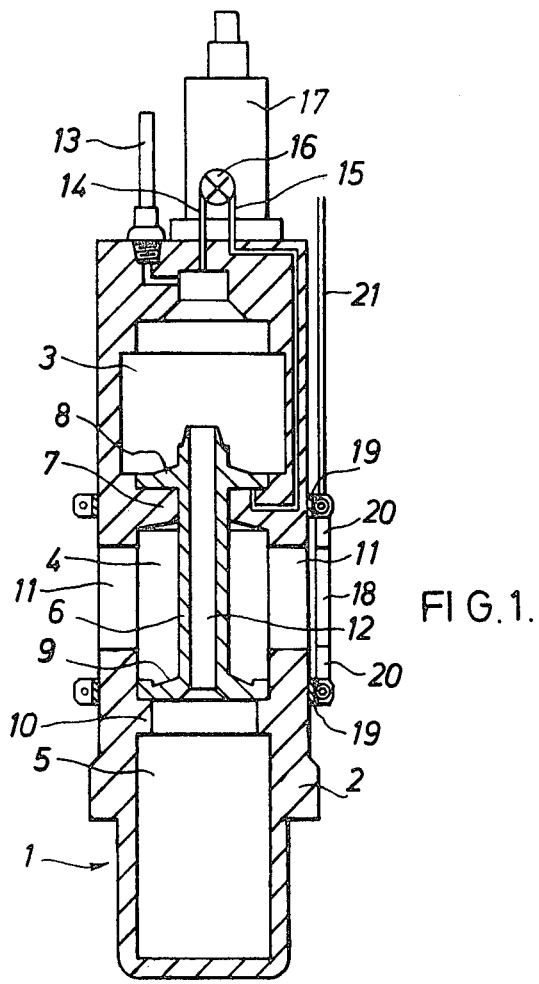
FIG. 1 is a partly diagrammatic sectional view of an air gun exemplifying the invention, in one of its aspects.

Referring first to FIG. 1, this shows an air gun 1 comprising a casing 2, the interior of which is divided into chambers 3, 4 and 5, by a shuttle valve 6. The chamber 3 is the main compressed air chamber and 5 is an auxiliary compressed air chamber, while 4 is a discharge chamber. The valve 6 is slidable in a wall 7 in the casing so that when the valve is in its closed position, as shown, its head 8 forms a seal against the wall 7, while its lower end 9 seats against a flange 10 in the casing. A number of ports 11 (two are shown) are formed in the sides of the casing 2 for the discharge of air from the chamber 4, while a passage 12 through the valve 6 connects the chambers 3 and 5. The gun has an air connection 13 through which compressed air is supplied continuously into the chamber 3 and thence into the chamber 5 so that a pressure of about 2,000 pounds per square inch is built up and maintained in these chambers so long as the valve 6 remains closed.

As shown in the drawing the gun is formed with passages 14 and 15 which are normally closed by a valve 16 but this valve can be opened by energising a solenoid 17 on the gun. When this solenoid is energised to open the valve 16 the admission of air beneath the head 8 of the valve 6 causes the latter to open rapidly and allow the discharge of compressed air through the ports 11 to produce a rapidly expanding air bubble and thus a seismic pulse.

The air gun as so far described is well known but, in accordance with the present invention, the gun in one of its aspects, is provided with at least one electrode 18 in or in front of at least one of the ports 11, in a position to form an electrically conductive path through the water to a second electrode. This second electrode may, as shown, be provided by the casing or body 2 of the gun or it would be possible to use a pair of separate electrodes mounted on the gun opposite the port 11.

In the construction of FIG. 1 there is a single electrode 18 which has the shape of a knife blade, the ends of which are bolted to lugs 19 fixed to the body 2 of the gun, from which they are insulated by suitable insulating washers. The electrode 18 (or electrodes if these are more than one) which may be made of stainless steel, preferably has or have a sharp edge or edges, particularly the edge or edges directed towards the port 11, so that the least resistance is offered to the air blast, which might otherwise damage the electrode or electrodes. The end sections 20 of the electrode blade (or blades) 18 may be covered by an insulating layer, such as one made of an epoxy resin, so that it is only the central section of the blade in front of the port 11 which makes electrical contact with the water.

An insulated lead 21 connects the blade 18 with the electrical circuit (to be described), the other electrical connection being from the casing 2, which is in good electrical contact with the water and forms the other electrode.

Figure 2:
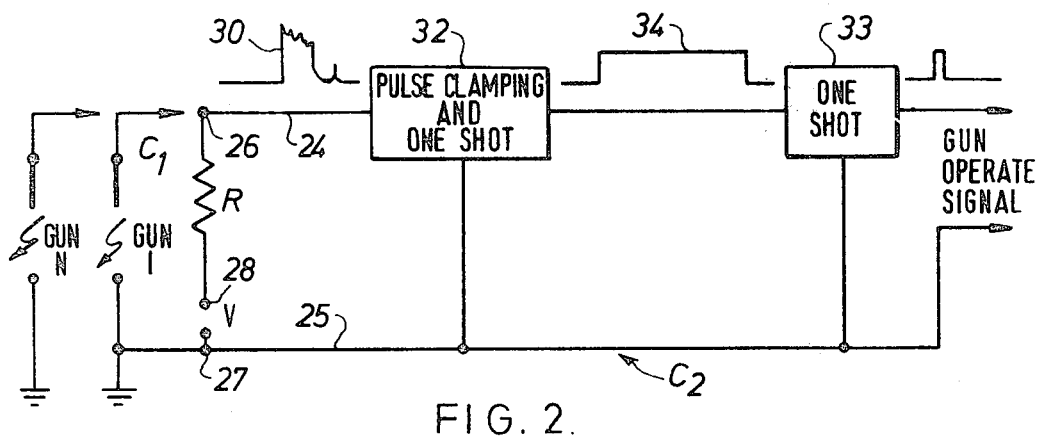
FIG. 2 shows very diagrammatically an example of a circuit which further exemplifies the invention.

Referring now to FIG. 2, this shows diagrammatically an electrical circuit with which the gun 1 of FIG. 1, or a number of guns $G_1$–$G_N$, can be used.

This circuit comprises a closed loop $C_1$ formed by the connection of a voltage source V and resistor R in series with the electrodes of the gun, and a pulse shaping circuit $C_2$ having input connections 24 and 25 which are connected to the loop $C_1$ at two points the potential difference between which will be abruptly changed (positively or negatively) by the increase in resistance between the gun electrodes produced by the firing of the gun. The connections may be to the terminals 26 and 27 as shown in FIG. 2 or they could be to the terminals 26 and 28.

Before the gun is fired a steady current will flow round the loop $C_1$, which includes the water path between the electrodes of the gun $G_1$. The instant air is discharged through the port 11, however, the current flow will be reduced and there will be an abrupt change in voltage distribution around $C_1$. As shown at 30 in FIGS. 2 and 3 this will take the form of an increase in the voltage applied to the connections 24 and 25, if they are connected to the terminals 26 and 28, with the production of a positive pulse, whereas if these connections had been to terminals 26 and 28 the result would have been a negative pulse, but a similar shape, as shown at 31 in FIG. 3.

Figure 3:
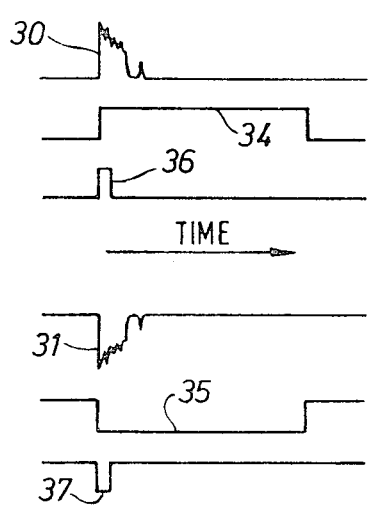
FIG. 3 illustrates typical voltage/time wave forms which can be produced when using the invention.

The pulse 30 or 31 is fed to a pulse clamping unit 32 (FIG. 2) which suppressed the noise which occurs after the initial fast rise (or fall) in voltage and prevents spurious trigger pulses from reaching a one shot unit 33 which converts the output 34 (or 35) of the unit 32 into a "gun operate" signal 36 (or 37) suitable for triggering the timing device to which the apparatus is connected. The shapes and relative timing of the signals or pulses are shown in FIG. 3.

Apart from the close and accurate relationship in time between the actual onset of energy on the firing of the gun and the gun operate signal a further advantage which is obtained by the invention is that it enables triggering pulses of better shape to be obtained because it is not necessary to include highly conductive components in the circuits.

Another important advantage of the invention over methods which might use a pressure detector, such as a hydrophone, mounted on or located close to a gun, with the object of producing a gun operate signal, is that such detectors would also respond to the firing of adjacent guns in the array, which would result in smearing of the pulses. The present invention does not suffer from this disadvantage.

FIGS. 4 to 7 show a number of other forms of electrode which may be used in place of the blade 13. Similar references will be used where appropriate.

Figure 4:
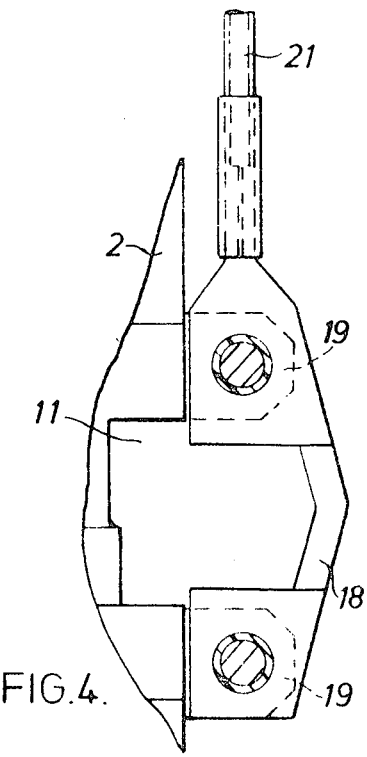
FIGS. 4 to 7 are detail views, partly in section, showing a number of modifications which may be made in the air gun shown in FIG. 1.

The electrode blade 18 shown in FIG. 4 and its attachments are similar to those shown in FIG. 1 except that the blade has the "V" shape shown in the drawing, to reduce the resistance offered to air discharged from the port 11.

Figure 5:
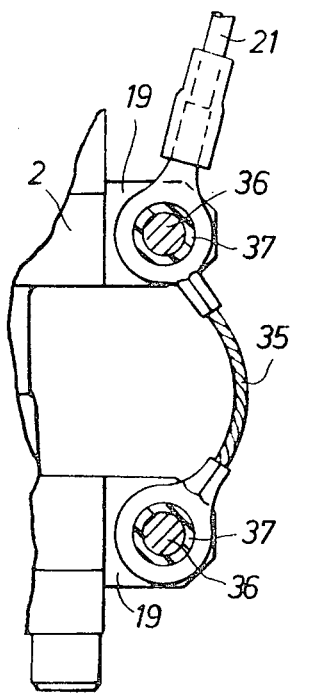

In FIG. 5 the blade 18 is replaced by a flexible wire 35, which may be made of stainless steel. Its ends are anchored to the lugs 19 in a similar manner to the blade 18, using bolts 36 and insulation 37 as shown.

Figure 6:
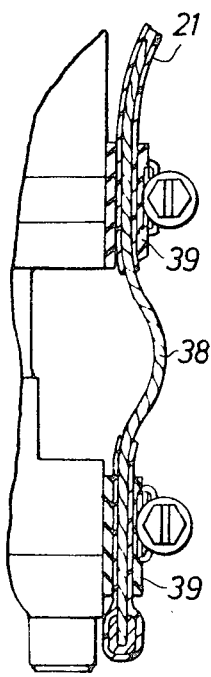

In FIG. 6 the attached electrode is formed by a bared section 38 of the otherwise insulated connecting lead 21, insulated parts of which are held in suitable clamps indicated at 39, which may take the form of Jubilee clips.

Figure 7:
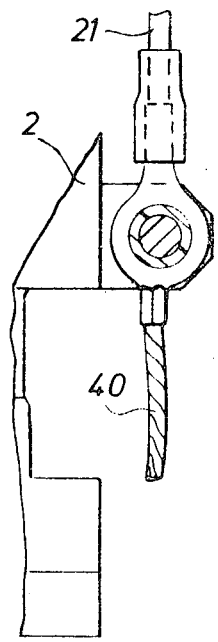

FIG. 7 shows an even simpler construction in which the electrode is constituted by the bared and trailing end 40 of the cable 21, which is attached to a single lug 19 and which is flexible enough to withstand the deflection produced each time the gun fires.

Although the invention could be applied to other under water ranging systems it is primarily intended for seismic reflection or refraction exploration. In particular it can be used to synchronise an array of, for example, 20 guns and it can do this with precision. The reference pulse from which travel times of reflections would be measured might be obtained from a hydrophone suspended in the water at a safe distance from the centre of the array.

I claim:

1. A marine gun for the production and timing of under water pulses comprising a body having an inlet for connection to a source of gas, at least one outlet port and means for controlling the discharge of gas under pressure through said port to produce an under water pulse, wherein said gun includes means for detecting the discharge of said gas, said detecting means including at least two electrodes both of which make electrical contact with the water surrounding the gun but are otherwise insulated from each other, wherein said electrodes form a gap in the path of the gas which is discharged from said port upon firing of the gun, such that firing of the gun produces an increase in the electrical resistance between said electrodes at the time of firing.

2. A gun according to claim 1, wherein one of said electrodes is provided by said body of the gun.

3. A gun according to claim 2, wherein the other of said electrodes is fixed to the body of said gun externally of said body and extending across the outlet of said port.

4. A gun according to claim 2, wherein the other of said electrodes is in the form of a metal blade the ends of which are fixed to but insulated from said body of the gun.

5. A gun according to claim 2, wherein the other of said electrodes is in the form of a length of wire the ends of which are connected to but insulated from said body of the gun.

6. A gun according to claim 2, wherein the other of said electrodes is flexible and has only one end thereof attached to but insulated from said body of the gun.

7. A gun according to claim 1 in combination with an electrical circuit for producing an electrical signal upon firing of the gun, said circuit including a voltage source and a resistor connected in series with each other and with said electrodes.

8. A gun and electrical circuit combination according to claim 7, which includes means for producing an electrical pulse of substantially square wave form from said signal, the onset of which pulse corresponds in time to the beginning of said signal.

9. A gun and electrical circuit combination according to claim 7, which includes means for producing from said signal a short pulse the time of which corresponds to the beginning of said signal.

* * * * *

Notice of Adverse Decision in Interference

In Interference No. 100,327, involving Patent No. 4,141,431, G. C. Baird, DETERMINATION OF FIRING TIMES OF ACOUSTIC PULSES, final judgment adverse to the patentee was rendered Mar. 18, 1981, as to claims 1, 2, 5 and 7.

[*Official Gazette June 2, 1981.*]